United States Patent [19]

Le Mer

[11] Patent Number: 4,909,191

[45] Date of Patent: Mar. 20, 1990

[54] HOT WATER PRODUCTION APPLIANCES

[75] Inventor: Joseph Le Mer, Saint Thegonnec, France

[73] Assignee: Chaffoteaux et Maury, France

[21] Appl. No.: 373,196

[22] Filed: Jun. 29, 1989

[30] Foreign Application Priority Data

Jul. 5, 1988 [FR] France ............................... 88 09090

[51] Int. Cl.⁴ ............................................... F22B 5/02
[52] U.S. Cl. ......................................... 122/18; 122/14; 122/19; 122/161; 126/361; 126/350 R
[58] Field of Search ............... 122/161, 167, 183, 156, 122/17, 18, 14, 19; 126/361, 362, 350 R

[56] References Cited

U.S. PATENT DOCUMENTS

| | | | |
|---|---|---|---|
| 4,344,386 | 8/1982 | Black | 122/19 |
| 4,366,778 | 1/1983 | Charrier et al. | 122/17 |
| 4,401,058 | 8/1983 | Charrier et al. | 122/17 |
| 4,413,590 | 11/1983 | Landream | 122/18 |
| 4,723,513 | 2/1988 | Vallett et al. | 122/19 |

*Primary Examiner*—Edward G. Favors
*Attorney, Agent, or Firm*—Larson and Taylor

[57] ABSTRACT

The invention concerns a single or double circuit hot water production applicance comprising, for the water, one or two nests of parallel vertical coaxial tubes (1) connecting together two rings (2,3) which are also coaxial and, for the combustive air admitted, an external jacket (7) with double wall and, finally, for the combustion gases, an annular intermediate sleeve (9) and a central discharge chimney (10, 11). The burner (14) fed with pressurized fuel gas (at 16) is disposed annularly between the upper ring (3) and the top of the chimney (11) and it is adapted so as to generate downwardly oriented flames. An inclined bottom (29) collects the condensates.

9 Claims, 4 Drawing Sheets

HOT WATER PRODUCTION APPLIANCES

The invention relates to hot water production appliances such as water heaters, bath heaters, central heating boilers,...

It relates more particularly, among these appliances, to those comprising a burner fed with pressurized fuel gas and combustive air and a heat exchanger itself formed of a water conduit extending from an inlet for the water to be heated as far as an outlet for the heated water and a "gas" circuit comprising a combustive air intake section and a guide section for the combustion gases, in which these gases are led on to the water conduit so as to yield up thereto their heat before being discharged cooled.

The object of the invention is especially to improve the appliances of the kind in question, particularly in so far as the efficiency of the heat exchange is concerned—which makes it possible to reduce the size and weight of the appliance for a given heating power—simplicity of manufacture and long life.

For this, the hot water production appliances of the kind in question according to the invention are essentially characterized in that their water conduit is formed by a nest of rectilinear, identical and parallel tubes spaced apart in a cylindrical annulus with vertical axis and each extending between two coaxial rings, in that the combustive air intake section comprises an annular jacket surrounding the nest of tubes, in that the combustion gas guide section comprises an intermediate annular sleeve through which the nest of tubes passes, the base of which sleeve is connected to the base of a central discharge chimney open at the top and in that the burner extends annularly, at the upper inlet of the annular sleeve, about the upper portion of the chimney and is adapted so that the flames generated thereby are oriented downwards.

In preferred embodiments, recourse is further had to one and/or other of the following arrangements:

the heat exchanger of the appliance comprises two independent water conduits assigned respectively to the sanitary water and to the heating water, each conduit comprising a portion of each rectilinear tube and a portion of each ring, each ring portion of a given conduit being connected sealingly exclusively to the tube portions corresponding to this conduit, and the rings are partitioned on the inside so as to break up the assembly of the n tube portions of each conduit into p contiguous banks each comprising n/p tube portions, p being an even number, preferably equal to 6 or 8, so that the water flow through the contiguous banks takes place alternately upwards and downwards, in an appliance according to the preceding paragraph, the rectilinear tubes are double tubes comprising a first tube with elliptic cross section with the large axis of the ellipsis extending radially with respect to the axis of the appliance and a second tube with circular cross section housed jointingly in the central zone of the first tube,, the portion of each double tube thus formed assigned to the sanitary water being the volume inside the inner tube and the remaining portion of the inside volume of the first tube being assigned to the heating water, the appliance is provided, in the vicinity of the "downstream" faces of the tubes, i.e. the faces of these tubes situated on the hot gas outlet side, with deflectors profiled so as to increase the heat exchange between these gases and these downstream faces, the appliance comprises baffles disposed across the intermediate sleeve so as to improve the heat exchange between the hot gases and the tubes, the intermediate annular sleeve comprises an upper widened portion forming an annular combustion chamber, the whole of the intake of combustive air through the annular jacket is fed into the intermediate annular sleeve through orifices of the burner, in the centre of which orifices the fuel gas is admitted, the grid in which the orifices of the annular burner are formed is situated at the level of the top of the upper ring forming part of the water conduit, the connection zone between the base of the intermediate annular sleeve and the base of the chimney is defined at the bottom by an inclined wall adapted to collect the condensates and connected to a lower discharge connection.

Apart from these main arrangements, the invention comprises certain other arrangements which are preferably used at the same time and which will be more explicitly discussed hereafter.

In what follows, two embodiments of the invention will be described with reference to the accompanying drawings in a way which is of course in no wise limitative.

FIGS. 1 and 2 of these drawings show respectively in axial vertical section through I—I of FIG. 2 and in horizontal cross section through II—II of FIG. 1, a hot water production appliance formed in accordance with the invention;

Figure 1:
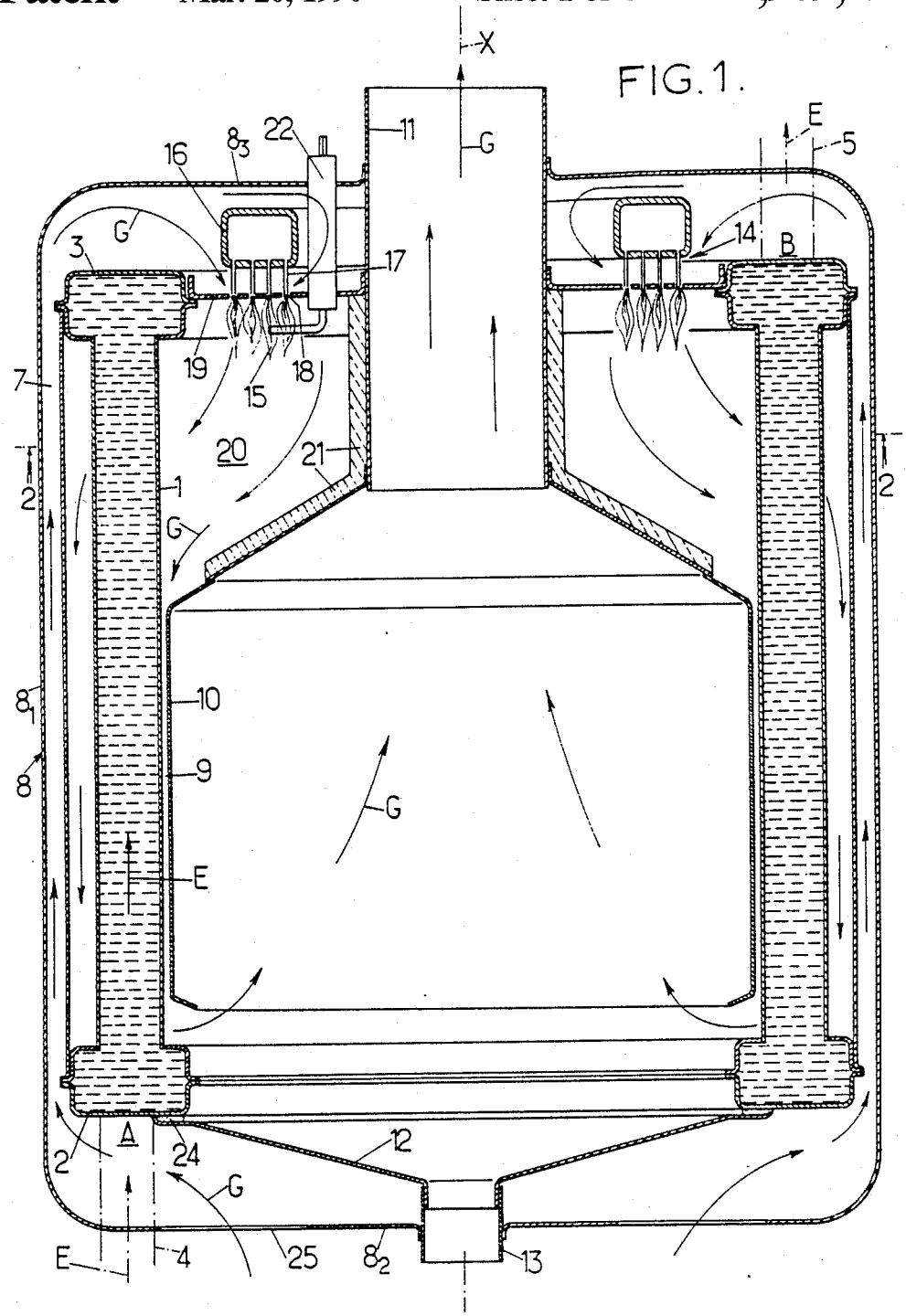
Figure 2:
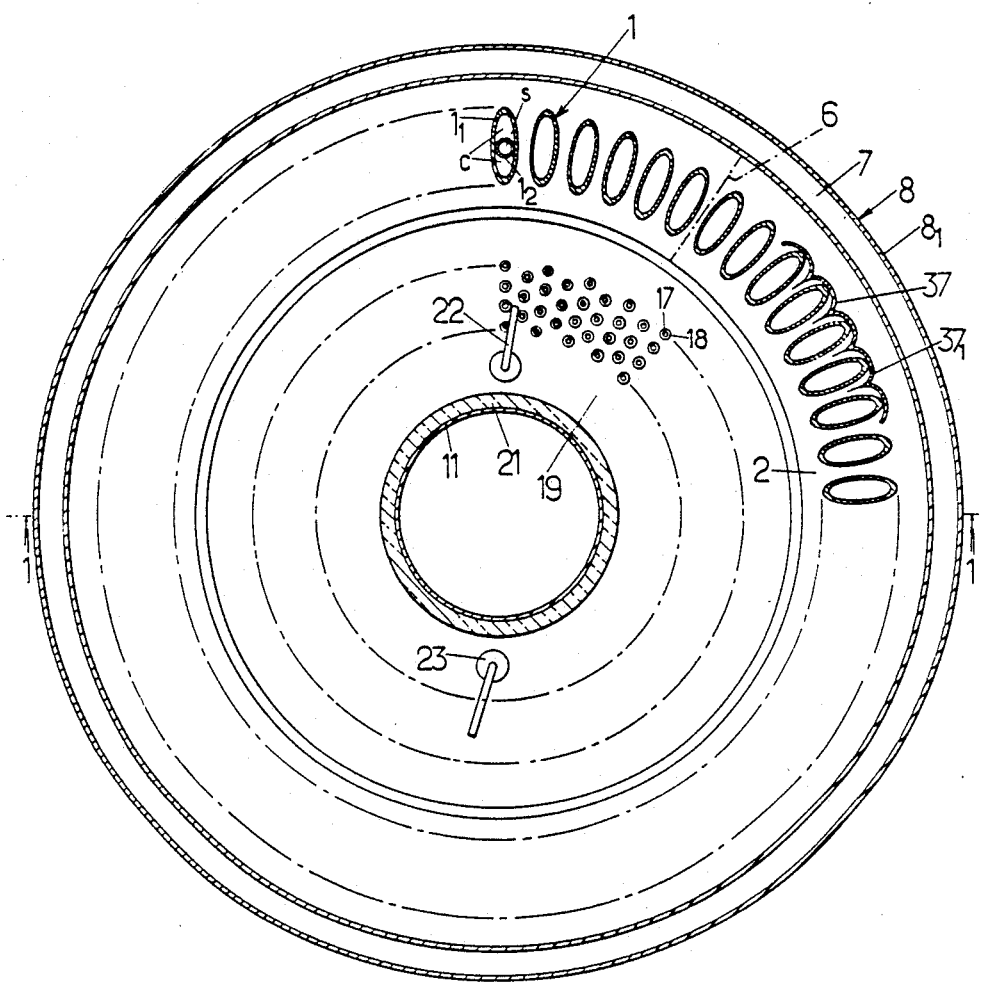

The appliance shown in FIGS. 1 and 2 has the general form of a cylinder of revolution with vertical axis X.

It comprises a conduit for the water to be heated, a gas burner fed with a pressurized fuel gas and a circuit for the gases, which are formed upstream by the combustive air and, downstream, or more precisely from the burner level, where the combustive air is mixed with the fuel gas so as to form the heating flames, by the combustion gases.

The water conduit comprises:

a "barrel" or nest of parallel, rectilinear and identical tubes 1 extending in a cylindrical annulus with axis X between a lower ring 2 and an upper ring 3, a cold water intake pipe 4 connected to the lower ring 2 at a point A, and a heated water discharge pipe 5 connected to the upper ring 3 at a point B.

The connection points A and B are disposed at positions, in rings 2 and 3, such that each drop of water to be heated is forced to pass through not only one of tubes 1, in the barrel, but also at least half of the circular extent of a ring 2 or 3.

For this it is advantageous to provide in each of these rings a radial dividing wall 6 preventing the water from taking too short a path : preferably, two such dividing walls 6 are disposed respectively in the two rings 2 and 3 in two superimposed zones in the same vertical plane, the lower intake point A then being placed on one side of this plane and point B, on the other side.

The cross section of each tube 1 preferably has the form of an ellipsis whose large axis extends radially with respect to axis X : the adoption of such a shape has the double advantage of conferring on the tubes a good resistance to deformation and providing a good heat exchange coefficient between the tubes and the gas flowing between these tubes.

The upstream portion of the gas circuit comprises an external cylindrical jacket 7 with double wall which envelops the nest of tubes 1.

This jacket is defined externally by the peripheral lateral portion $8_1$ of the respective cover 8 of the appliance.

This cover 8 also comprises two flat horizontal portions $8_2$ and $8_3$ extending the side portion $8_1$ at the bottom and at the top and forming the bottom and roof of the appliance.

Bottom $8_2$ is formed with an orifice 25 communicating with the free air, which orifice forms the combustive air intake opening in jacket 7.

The downstream portion of the gas circuit comprises :

an intermediate sleeve 9 which is disposed inside jacket 7 and through which the tubes 1 pass, a central chimney 10 whose base is connected to the base of sleeve 9 and whose upper portion, in the form of a cylindrical and narrowed neck 11, is connected towards the top to an external discharge pipe.

The common connection base between sleeve 9 and chimney 10 is defined towards the bottom by an inclined wall 12 in the shape of a funnel adapted for collecting the condensates and discharging them into a central lower discharge connection 13.

Burner 14 has an annular shape surrounding neck 11 and it is adapted so as to produce downwardly oriented flames 15.

More precisely, it comprises here a feeder 16 supplied with pressurized fuel gas and connected to a plurality of distribution needles 17 which open at the centres of apertures 18 formed in a wall 19.

This apertured wall 19 has the general shape of a flat horizontal washer connecting neck 11 transversely to ring 3.

Each aperture 18 is therefore fed at its centre with fuel gas and for the rest of its cross section with combustive air coming from jacket 7.

The different dimensions and configurations of needles 17 and holes 18 are chosen so that the combustive air-fuel gas mixture projected downwards through each aperture 18 has a composition leading to good combustion (slight air excess).

A burner of this type has been described in the patent application U.S. Pat. No. 07/326 804 of the Applicant.

The annular combustion chamber 20 in which the downwardly directed flames 15 are formed is the upper widened zone of sleeve 19, surrounding the base of the neck of chimney 11.

So as to avoid too great a transfer of the heat generated in this chamber towards neck 11, the wall which separates this neck from this chamber is lined with a refractory and heat insulating lagging 21, which wall has a cylindrical upper section and a downward divergent truncated cone shaped lower section.

There can be further seen in the drawings:
an ignition electrode 22,
a flame detector 23 situated in a position diametrically opposite igniter 22 with respect to axis X,
and an annular seal 24 inserted between funnel 12 and the lower ring 2.

The different elements forming the water conduit and the gas circuit of the appliance are advantageously formed by thin stamped stainless steel sheets which are crimped or welded together.

The operation of the appliance described above is the following.

It is assumed that this operation corresponds to normal operating conditions, after ignition of the burner : such ignition is controlled in a way known per se, either by the water flow through the conduit 1-5 or by exceeding a temperature threshold. This control results in the opening of a supply valve of the fuel gas feeder 16, ignition of the air-gas mixture then delivered through apertures 18 being provided by sparks coming from igniter 22 with control by detector 23.

The water to be heated flows in the direction of arrows E.

It is admitted through pipe 4 in the lower ring 2.

From there it rises through tubes 1 as far as ring 3, then, heated, it leaves the appliance through pipe 5.

Considering the identity of the pressure losses undergone by the water in all the parallel circuits likely to be taken by this water, the water flow is divided identically between all the tubes 1 and the volume of water in circulation rises then simultaneously through all these tubes.

The gases flow in the direction of arrows G.

The ambient air is firstly introduced at the base of the appliance at 25 and is heated by a few degrees when rising through jacket 7, after which it reaches the upper ring 3 and changes direction and descends to the level of the burner.

It is then ejected through apertues 18, where it joins up with the central fuel gas jets leaving the needles 17.

The combustion of the air-gas mixture thus projected generates flames 15 in the combustion chamber 20.

The very hot combustion gases from this chamber 20 then flow along tubes 1 and surround these tubes in a downward flow.

At the base of these tubes, the cooled gases pass along the lower ring 2 before once more changing direction and escape upwards through the central chimney 10-11.

Figure 3:
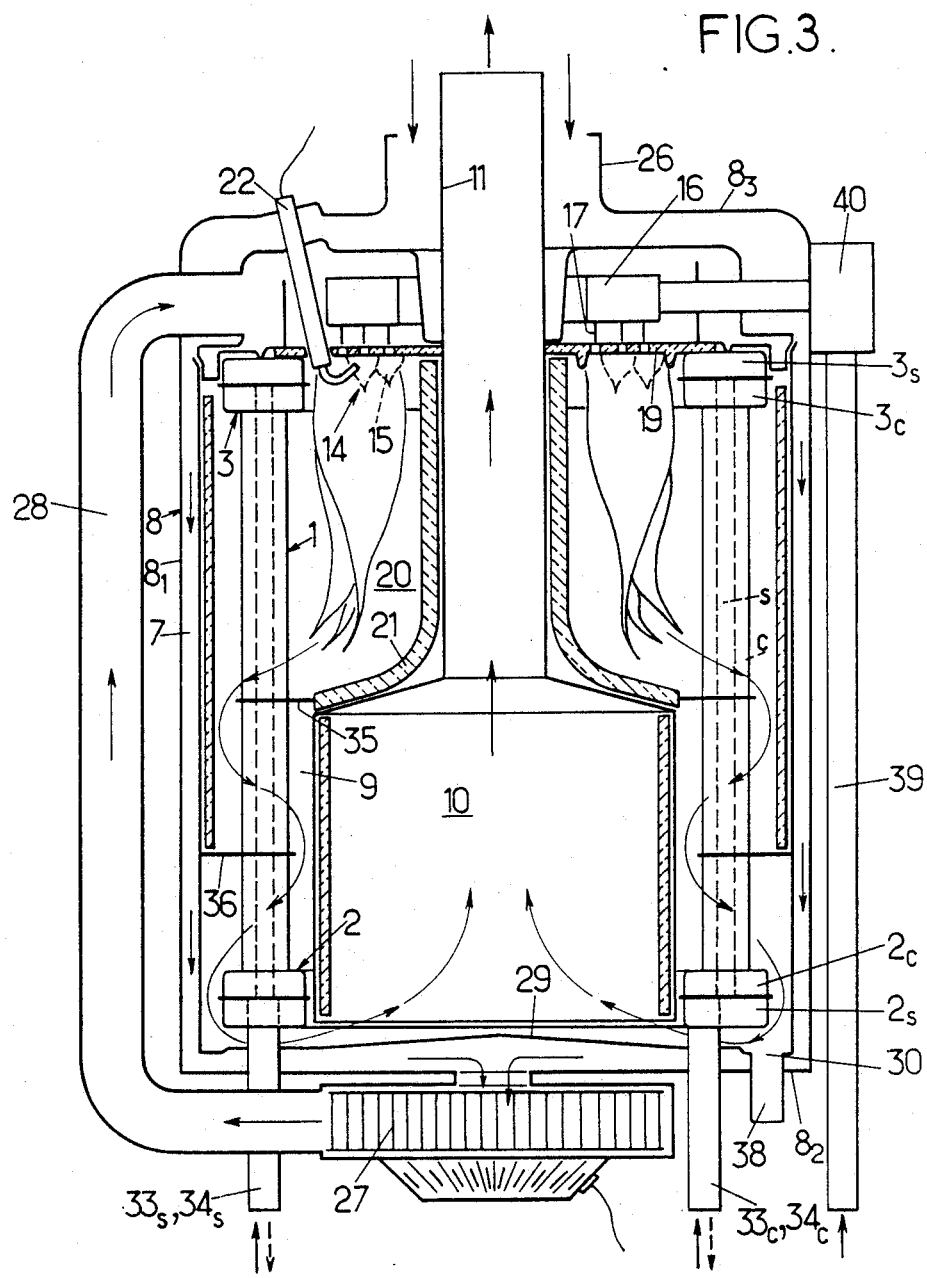
FIG. 3 shows, similarly to FIG. 1 but a little more schematically, a variant of such an appliance, also in accordance with the invention.
Figure 4:
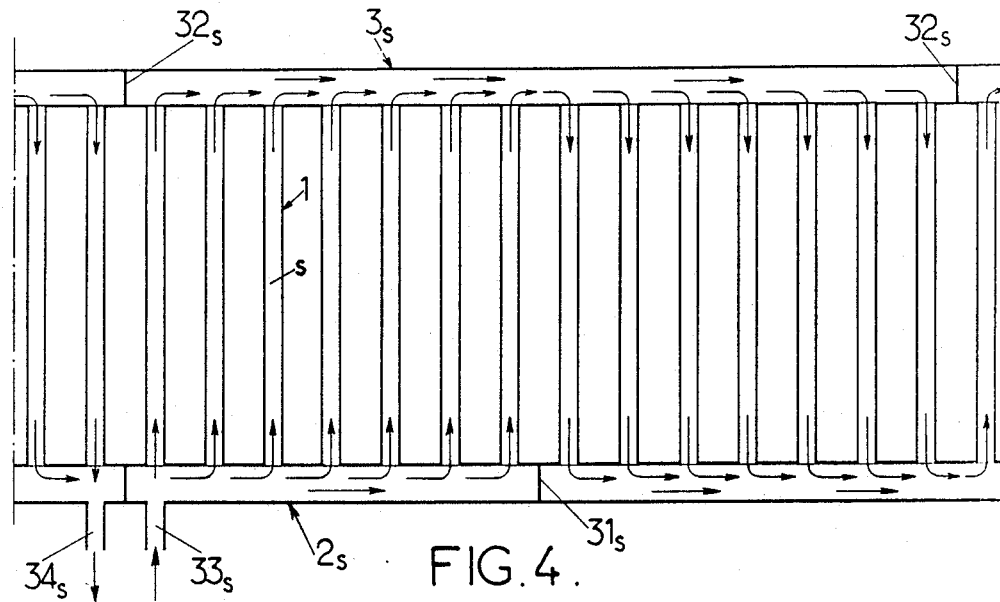
FIGS. 4 and 5 are diagrams relative to the water flow in the appliance of FIG. 3.
Figure 5:
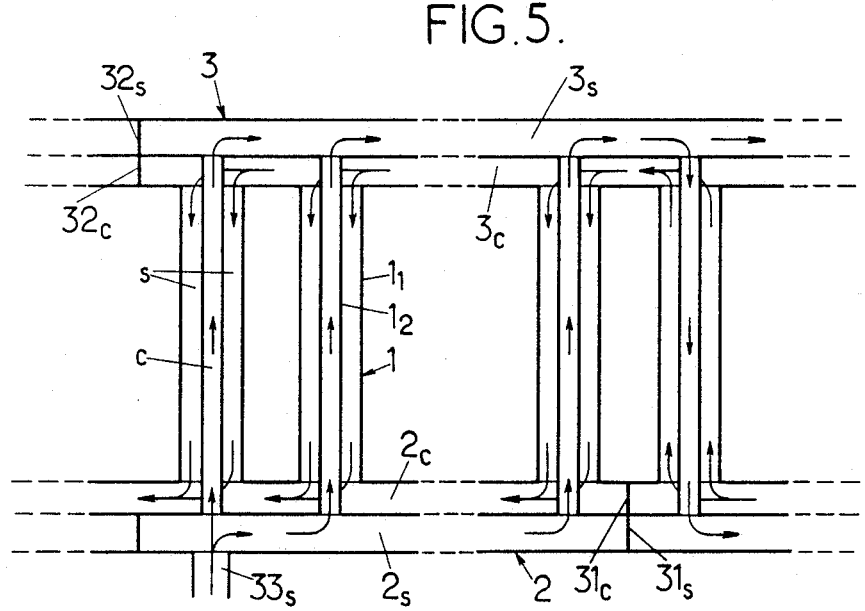

In the hot water production appliance shown in FIGS. 3 to 5, we find a number of the features which have been described above in connection with the appliance of FIGS. 1 and 2 and the corresponding elements are shown in the drawings with the same references as before.

This new appliance differs from the preceding one by the different points described hereafter.

Instead of being admitted at the base of the cylindrical external jacket 7, the combustive air is this time admitted into this jacket through its top, through a neck 26 surrounding the top portion 11 of the central chimney, with clearance, said neck extending the lid $8_3$ of the cover upwards.

The air in question then flows from top to bottom through said jacket 7, it is taken up at the base of this jacket, through a hole formed in the centre of bottom $8_2$, by a fan 27 disposed below this hole, then it is driven through a pipe 28 above the annular burner 14.

Bottom 29, intended to collect the condensates, is here again conical, but it has this time its tip pointing upwards and not downwards and the condensates collected are discharged through an off-centred opening 30.

Instead of being distributed at the top and bottom of the appliance, all the connections for the water and for the fuel gas are here disposed at the base of the appliance, which facilitates mounting and dismantling.

Instead of being formed by an appliance with a single water circuit of the water heater type, the appliance considered here is a combined boiler for providing at one and the same time central heating by hot water flow through radiators and heating of the sanitary water.

For this, its exchanger comprises two independent water conduits each comprising a portion of each water tube 1 and a portion of each ring 2, 3.

More precisely, each tube 1 is here a double tube formed of a first tube $1_1$ with elliptic section of the kind described above and the second tube $1_2$ with circular section housed jointingly inside the central zone of tube $1_1$.

The inner volume of each double tube thus defined may then be considered as formed of two portions, one s inside the central circular tube $1_2$, reserved for the flow of sanitary water and the other c reserved for flow of the heating water and comprising the two remaining volumes disposed on each side of the central tube $1_2$, inside the elliptic tube $1_1$.

Further, each ring 2, 3 is here a double ring formed of two elementary rings or annular halves superimposed vertically one on the other and each conduit comprises a half of each double ring, alone connected sealingly to the tube portions s or c concerned.

In what follows the index s relates to the sanitary water circuit and the index c to the heating water circuit.

Thus, in the embodiment illustrated, the lower half $2_s$ of the lower ring 2 and the upper half $3_s$ of the upper ring 3 are assigned to the sanitary water whereas the other two ring halves $2_c$ and $3_c$ are assigned to the heating water.

Furthermore, each cylindrical annulus of n tube portions s or c is broken down into p successive banks of such tube portions, which banks are defined as follows:
  p is an even number, preferably equal to 6 or 8,
  the water flows in the same upward or downward direction through all the tube portions of the same bank,
  the water flows in two opposite directions in the banks which are contiguous two by two.

To obtain such an arrangement, each of the elementary rings is divided circumferentially, by diametrical dividing walls 31, 32, of the same kind as dividing wall 6 above, into p/2 successive identical sections, the respective positions of dividing walls 31 in the lower ring being offset angularly by 360°/p about the axis of the appliance with respect to those of dividing walls 32 in the upper ring.

With such a distribution, shown in FIG. 4 for the sanitary water, the cold or relatively cold water admitted at the upstream bottom end $33_s$ of a bank follows first of all a section of the lower ring $2_s$, then rises through the n/p parallel tube portions s of the first bank as far as the corresponding upper ring $3_s$, then it flows through a section of this upper ring before flowing down again through the parallel tube portions of the second bank, and so on, the heated water arriving at the end of the path being finally discharged at the downstream bottom end $34_s$ of the last bank of rank p.

This sinuous flow of the water, by successive alternate upwards and downward passes, has, over the flow pattern shown in FIG. 1, the advantage of a greater speed, this speed being multiplied by the coefficient p, which prevents the formation of limit layers on the tubes and so improves the heat transfer coefficient between the hot gases and these tubes.

In an embodiment which has given every satisfaction, the values adopted respectively for parameters n and p were 56 and 8, each bank comprising then 7 tubes.

Each of the two sanitary water and heating water flows is organized as in the above described sinuous arrangement.

Since these two flows are independent, their respective directions can be chosen at will as well as the angular positions for intake of cold or relatively cold water and discharge of hot water and even the number of tube portions included in each bank.

For example, as in the case of FIG. 5, the following may be chosen:
  identical numbers p for the two circuits,
  opposite flow directions for the water through these circuits, the water then flowing contraflow wise through said circuits,
  diametrically opposite angular positions in the cylindrical annulus formed by the different tubes for the intakes corresponding to the two circuits as well as for discharge thereof,
  and identical angular positions in twos for the separating walls—such as $31_s$ and $31_c$, or $32_s$ and $32_c$—corresponding respectively to the two sanitary water drawing and heating water circuits and belonging to the same double ring 2 or 3, except of course for the end dividing walls.

In a way known per se, in order to improve the efficiency of the heat exchanges, means are provided for causing the heating water to flow in the corresponding circuit whenever sanitary water is drawn off.

To improve the heat exchange between the hot gases and the tubes, recourse is further had advantageously to baffles and/or deflectors adapted for deflecting the stream of said gases appropriately.

The baffles are advantageously two metal discs 35, 56 mounted in the inner sleeve 9 and apertured so that the tubes can pass therethrough; one of these discs 35, the upper one, is carried by the dividing wall defining the central chimney 10 so as to drive the gases radially outwardly whereas the other disc 36, the lower one, is carried by the dividing wall defining inwardly the external jacket 7 so as to drive the gases radially inwardly, these gases being again driven radially outwardly at the bottom of sleeve 9 so as to pass round the lower ring 2.

The deflectors are formed by profiled screens 37 (FIG. 2) disposed in the vicinity of the "downstream" faces of the tubes, i.e. the faces of these tubes disposed on the same side as the outlet of the hot gases passing radially between said tubes.

The profile of these screens 37 is provided so as to send said gases against said downstream faces and increase their flow speed.

Furthermore, apertures $37_1$ are formed in said screens so as to form passages for the gases.

Deflectors 37 may be mounted on baffles 36 and bear laterally against the tubes.

They may also be limited to their curved portions alone included between the tubes, which portions are connected together by continuous strips at least in the vicinity of their axial ends.

In FIG. 3 can be seen, gathered together at the bottom of the appliance:
  the connections $33_s$, $33_c$, $34_s$ and $34_c$ corresponding respectively to the sanitary water and heating water inlets and to the sanitary water and heating water outlets, a connection 38 extending the condensate discharge orifice 30 downwards, and a pipe 39 for intake of the fuel gas into feeder 16 through a regulation member 40.

Following which, and whatever the embodiment adopted, a hot water production appliance is finally obtained whose construction and operation are sufficiently clear from the foregoing.

This appliance has numerous advantages with respect to those known heretofore and especially the following:

the heat exchange efficiency is very high, manufacture of the appliance is particularly simple, and it has remarkable strength and long life, as well as reduced size.

As is evident and as it follows moreover from what has gone before, the invention is in no wise limited to those of its modes of application and embodiments which have been more especially considered; it embraces, on the contrary, all variants thereof.

I claim:

1. Hot water production appliance comprising a burner fed with pressurized fuel gas and combustive air and a heat exchanger itself formed of a water conduit extending from an inlet for the water to be heated as far as an outlet for the heated water and a "gas" circuit comprising a combustive air intake section and a guide section for the combustion gases, in which these gases are led on to the water conduit so as to yield up thereto their heat before being discharged cooled, characterized in that the water conduit is formed by a nest of rectilinear, identical and parallel tubes (1) spaced apart in a cylindrical annulus with vertical axis and each extending between two coaxial rings (2,3), in that the combustive air intake section comprises an annular jacket (7) surrounding the nest of tubes, in that the combustion gas guide section comprises an intermediate annular sleeve (9) through which the nest of tubes passes, the base of which sleeve is connected to the base of a central discharge chimney (10, 11) open at the top and in that the burner (14) extends annularly, at the upper inlet of the annular sleeve, about the upper portion (11) of the chimney and is adapted so that the flames (15) generated thereby are oriented downwards.

2. Appliance according to claim 1, characterized in that the heat exchanger comprises two independent water conduits assigned respectively to the sanitary water and to the heating water, each conduit comprising a portion (s, c) of each rectilinear tube and a portion $(2_s, 3_s; 2_c, 3_c)$ of each ring, each ring portion of a given conduit being connected sealingly exclusively to the tube portions corresponding to this conduit, and in that the rings are partitioned on the inside (at $31_s$, $31_c$, $32_s$, $32_c$) so as to break up the assembly of the n tube portions of each conduit into p contiguous banks each comprising n/p tube portions, p being an even number, so that the water flow through the contiguous banks takes place alternately upwards and downwards.

3. Appliance according to claim 2, characterized in that the rectilinear tubes (1) are double tubes comprising a first tube (1₁) with elliptic cross section with the large axis of the ellipsis extending radially with respect to the axis (X) of the appliance and a second tube (1₂) with circular cross section housed jointingly in the central zone of the first tube, the portion of each double tube thus formed assigned to the sanitary water being the volume (s) inside the inner tube and the remaining portion (c) of the inside volume of the first tube being assigned to the heating water.

4. Appliance according to claim 2, characterized in that it comprises, in the vicinity of the "downstream" faces of the tubes, i.e. the faces of these tubes situated on the hot gas outlet side, deflectors (37) profiled so as to increase the heat exchange between these gases and these downstream faces.

5. Appliance according to claim 1, characterized in that it comprises baffles (35, 36) disposed across the intermediate sleeve (9) so as to improve the heat exchange between the hot gases and the tubes.

6. Appliance according to claim 1, characterized in that the intermediate annular sleeve (9) comprises an upper widened portion forming an annular combustion chamber (20).

7. Appliance according to claim 1, characterized in that the whole of the intake of combustive air admitted through the annular jacket (7) is fed into the intermediate annular sleeve through orifices (18) of the burner, in the centre of which orifices the fuel gas is admitted.

8. Appliance according to claim 7, characterized in that the grid (19) in which the orifices (18) of the annular burner (14) are formed is situated at the level of the top of the upper ring (3) forming part of the water conduit.

9. Appliance according to claim 1, characterized in that the connection zone between the base of the intermediate annular sleeve (9) and the base of the chimney (10) is defined at the bottom by an inclined wall (12, 29) adapted to collect the condensates and connected to a lower discharge connection (13, 30).

* * * * *